(No Model.)
H. S. McKEE.
FLY TRAP.
No. 439,545.  Patented Oct. 28, 1890.
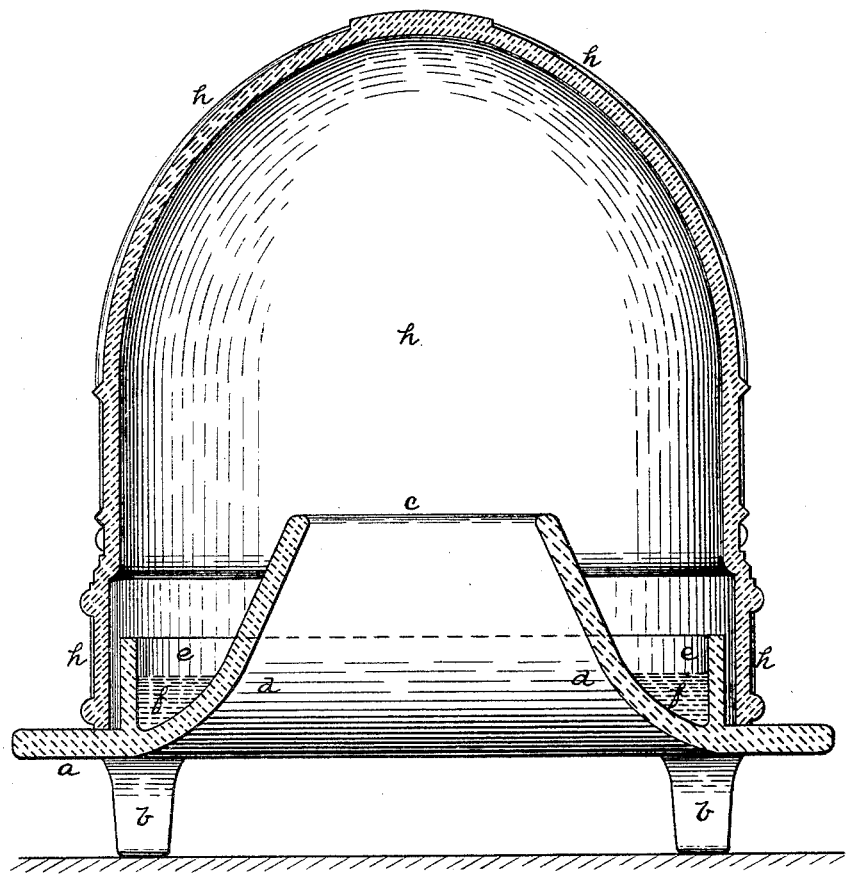
Witnesses:
J. A. Cooke
Rob't D. Totten
Inventor:
Henry Sellers McKee
By James I. Kay
Attorney

UNITED STATES PATENT OFFICE.

HENRY SELLERS McKEE, OF ALLEGHENY, PENNSYLVANIA.

FLY-TRAP.

SPECIFICATION forming part of Letters Patent No. 439,545, dated October 28, 1890.

Application filed June 21, 1890. Serial No. 356,192. (No model.)

*To all whom it may concern:*

Be it known that I, HENRY SELLERS MC-KEE, a resident of Allegheny, in the county of Allegheny and State of Pennsylvania, have invented a new and useful Improvement in Fly-Traps; and I do hereby declare the following to be a full, clear, and exact description thereof.

My invention relates to what are known as "fly-traps," its object being to provide a neat and efficient form of trap which can be quickly opened in order to replenish the trough with the liquid and remove from the trap the flies caught therein, and also provide a form of trap which can be quickly formed from glass.

To these ends it comprises, generally stated, a fly-trap having a glass or like base provided with a raised central portion open at the top and with a surrounding ring or flange, so as to form a trough around said central portion, and having a hollow cover fitting over and resting on the base and around the trough formed thereon, so that the flies can pass under the base, which is supported by suitable feet, and enter the trap through the central opening thereof, and as they are overcome by the acidulous atmosphere maintained within the trap will drop into the trough, while in order to remove the flies so caught and to replenish the trough it is only necessary to lift off the cover, which is separate entirely from the base containing the trough.

To enable others skilled in the art to make and use my invention, I will describe the same more fully, referring to the accompanying drawing, which shows a longitudinal section of the construction of my improved trap.

Like letters of reference indicate like parts.

The base $a$ of the trap is formed of glass, porcelain, or like material pressed to shape, and is provided with the feet $b$, which act to raise it above the surface of the stand on which it rests, and has the central opening $c$, the central portion $d$ of the base being raised and having the form of a truncated cone, so that the flies can pass under the base and through the central opening $c$ into the trap. Formed on the base $a$, and surrounding the central portion $d$, is the annular flange or rib $e$, which extends up above the body of the base a sufficient distance to form a trough $f$ between it and the raised central portion $d$ for the reception of liquid, such as acidulous water. The flange $e$ also acts as a guide for directing the cover $h$ down into the base. This flange may be dispensed with, however, a simple guide-seat for the cover being employed, and the acidulous water be held by a sponge placed around the central opening. The cover $h$ is also formed of glass, porcelain, or like material, and it is pressed to shape and may be ornamented as desired, so as to give a handsome appearance to the trap, and while permitting the light to enter through the cover into the trap may, if desired, conceal the contents of the trap. The cover $h$ may be of any desired shape, (such shape as will add to the appearance of the article being of course preferred,) the cover shown in the drawing being of bee-hive form, so that the fly-trap has a very pleasing appearance.

In the use of the trap any small dish containing sugar or other substance to attract the flies is placed under the base $a$, and the acidulous water is placed in the trough $f$ or held by a sponge resting on the base, and the cover $h$ placed upon the base. The flies, attracted by the material in the dish under the base, will pass under the base, and will naturally fly up within the body of the trap, and though the opening $c$ is large, as is well known, in such traps the flies when so caught will not naturally pass down through the same again, and will be quickly overcome by the acidulous atmosphere within the trap and drop onto the base thereof.

In order to clean the trap, it is only necessary to lift off the cover, leaving the flies caught within the trough of the base, which can be quickly cleansed and reprepared for use, the trap being thus exceedingly simple and easy to care for.

What I claim as my invention, and desire to secure by Letters Patent, is—

1. In a fly-trap, the combination of a glass or like base having a central opening therein and a trough surrounding said opening, and a glass cover fitting over and resting on the base and around the trough thereof, substantially as and for the purposes set forth.

2. In a trap, the combination of the glass or like base $a$, having the central raised portion $d$, provided with the central opening $c$ at the top thereof, and having the annular flange $e$, forming the trough $f$ between said flange and the raised portion $d$, and the cover $h$, fitting over and resting on said base and around said annular flange $e$, substantially as and for the purposes set forth.

In testimony whereof I, the said HENRY SELLERS MCKEE, have hereunto set my hand.

HENRY SELLERS McKEE.

Witnesses:
ROBT. D. TOTTEN,
J. N. COOKE.